(No Model.)
T. A. EDISON.
EXPANSIBLE PULLEY.
No. 476,984. Patented June 14, 1892.
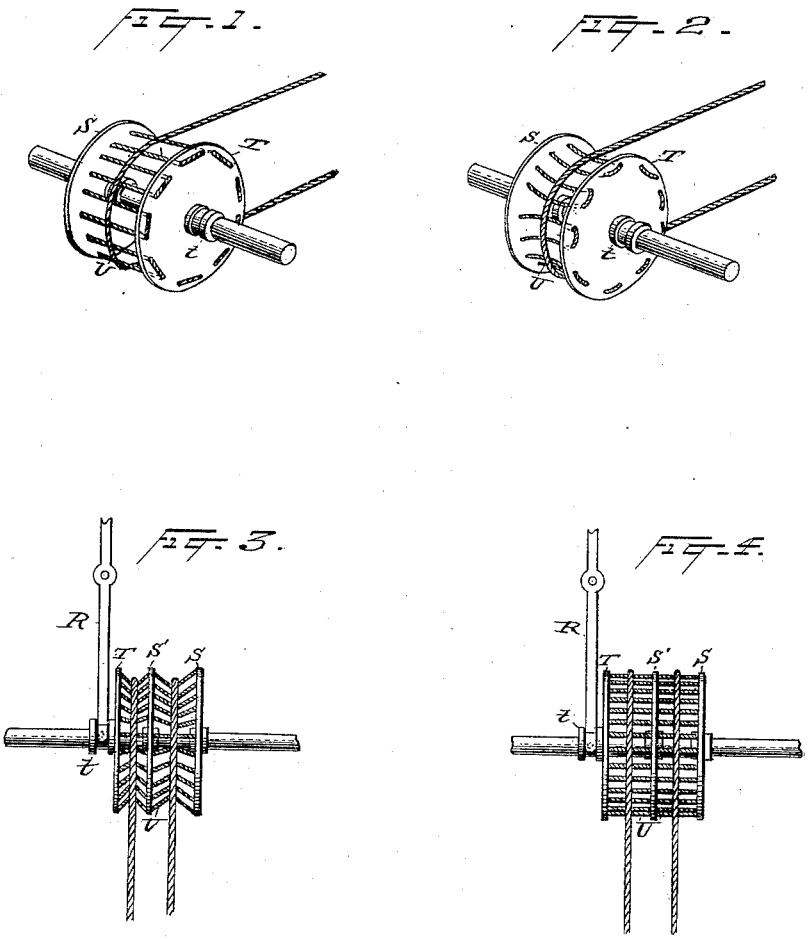
Witnesses
Norris A. Clark
W. Pelzer
Inventor
Thomas A. Edison
By his Attorneys

UNITED STATES PATENT OFFICE.

THOMAS A. EDISON, OF LLEWELLYN PARK, NEW JERSEY.

EXPANSIBLE PULLEY.

SPECIFICATION forming part of Letters Patent No. 476,984, dated June 14, 1892.

Original application filed June 10, 1890, Serial No. 354,946. Divided and this application filed August 28, 1890. Serial No. 363,255. (No model.)

*To all whom it may concern:*

Be it known that I, THOMAS A. EDISON, a citizen of the United States, residing a Llewellyn Park, in the county of Essex and State of New Jersey, have invented a certain new and useful Improvement in Expansible Pulleys, (Case No. 872,) of which the following is a specification.

This invention relates to power-transmitting pulleys, and the main objects are to provide a simple and efficient pulley the working circumference of which may be varied as required; and the invention consists in the several features and combinations hereinafter described and claimed.

In the accompanying drawings, forming a part hereof, Figures 1 and 2 are perspective views of a simple form of my expansible pulley, and Figs. 3 and 4 are elevations of a compound expanding pulley constructed upon the same principle.

S is a disk fixed against sliding movement, and T is a sliding disk adapted to be moved by the arm R. These disks are provided near their periphery with smooth holes, through which is threaded a rope U the ends of which are suitably fastened. As the sliding disk T is moved toward the fixed disk S the strain of the endless belt will take up the slack in the pulley-rope U and cause the pulley to act as if of a definitely-smaller size, as shown in Fig. 2. If a pulley adapted to carry two ropes or belts is required, the same construction can be employed, as shown in Figs. 3 and 4, in which an additional fixed disk S' is used, placed between the disks S and T and having holes through which the rope U passes. As the sliding disk T is moved toward the middle fixed disk S' the pulley-rope will be drawn through the holes in this disk S' by the strain of the driving-belt and the contracted pulley will appear as in Fig. 4. It is evident that the same result could be obtained by other relative movements of the disks such as by rotating the disk T instead of sliding it. The sliding disk T in both the simple and compound pulley is provided with a grooved collar t, by means of which this disk can be moved, as will be readily understood.

I am aware that the heads of expansible pulleys have been joined together by loose or jointed rods; but my invention is confined to the use of connections of flexible material, such as rope. This furnishes a cheap device and one whose construction and operation are exceedingly simple and which is not likely to get out of order. By the phrase "one of which (disks) is movable relative to the other" it is not intended to convey the idea that the second disk must necessarily be stationary, but the movement must be such as to change the relative location of the disks. The terms "ropes" and "cords" obviously include other flexible strands or bodies which can be used in the manner above described, such as leather straps, chains, &c., (as distinguished from rigid rods or other rigid bodies.)

This application is a division required by the Patent Office of a prior application filed June 10, 1890, on which a patent has been issued, No. 436,970, dated September 23, 1890.

What I claim is—

1. An expansible pulley having heads or disks, one of which is movable relative to the other, and a rope connection between the disks, upon which the belt travels and the working circumference of which is made smaller or larger, as desired, substantially as set forth.

2. An expansible pulley having heads or disks, one of which is movable relative to the other, and a connection between the same by means of flexible ropes or cords threaded through holes in the disks, substantially as set forth.

This specification signed and witnessed this 9th day of August, 1890.

THOS. A. EDISON.

Witnesses:
RICHD. N. DYER,
W. PELZER.